Oct. 18, 1932.  W. J. FLINTJER  1,883,666
BEET HARVESTER
Filed April 9, 1931    5 Sheets-Sheet 5

Patented Oct. 18, 1932

1,883,666

UNITED STATES PATENT OFFICE

WALTER J. FLINTJER, OF CHEYENNE, WYOMING

BEET HARVESTER

Application filed April 9, 1931. Serial No. 528,909.

This invention relates to machines for harvesting beets and the general object of the invention is to provide a beet harvesting machine whereby the beets are pulled, the tops cut off, the beets discharged on to an elevator whereby they are carried to and discharged into a wagon and whereby the tops when cut off are discharged in piles on to the ground.

A further object is to provide a machine of this character which will leave the beets in a thoroughly cleaned condition and to this end to provide means whereby the beets as they travel upward and toward the cutters may be shaken and agitated so that the sand and dirt may be shaken from the beet and the beet left in a thoroughly clean condition.

A further object in this connection is to provide two means whereby the beet may be agitated, one being particularly adapted for agitating the beet in sandy soil where the sand may be readily detached from the beet and the other where earth may be detached from the beet and where, therefore, the beet requires a greater agitation.

A further object is to provide an endless carrier which is adapted to grip the beet top and move upward with the beet and toward the cutters which cut the beet from the top and which is so mounted as to exert a yielding but strong pressure upon the beet top and yet permit the top to be pulled downward out of engagement with the beet top gripping devices when the beet top is to be discharged.

Other objects will appear in the course of the following description.

My invention is illustrated in the accompanying drawings, wherein:—

Figure 2 is a side elevation thereof;

Figure 1:
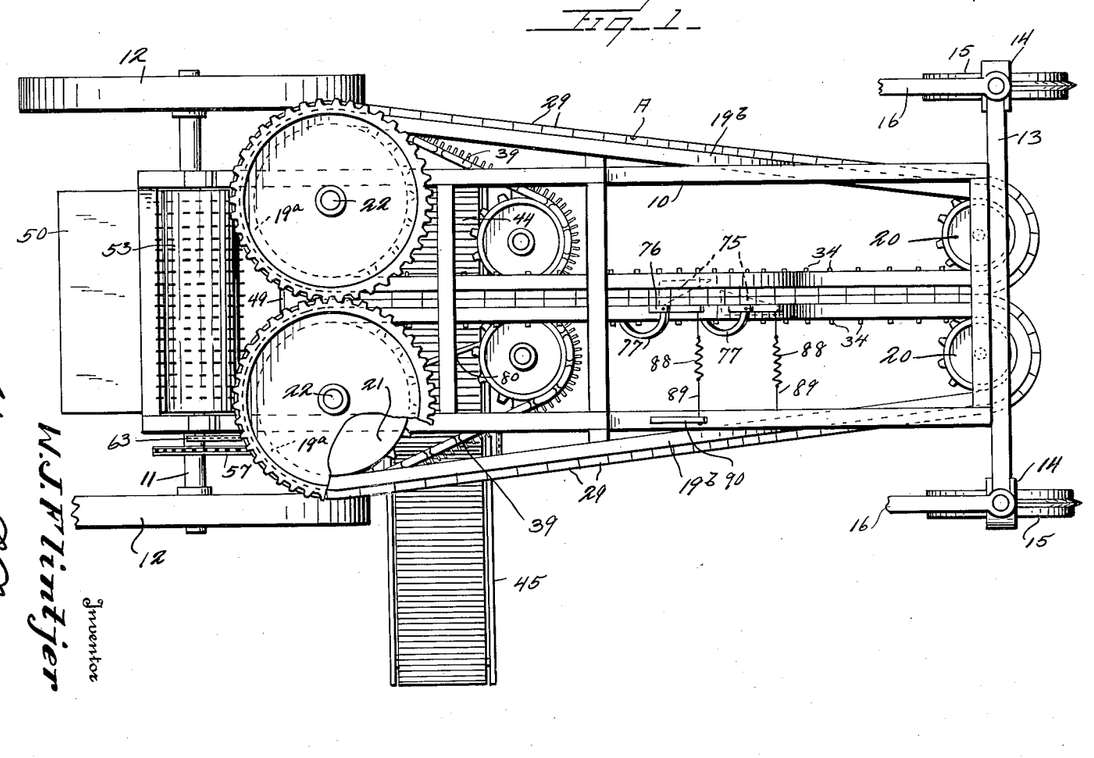
Figure 1 is a top plan view of a beet harvester and loader constructed in accordance with my invention.
Figures 5, 11, 12:
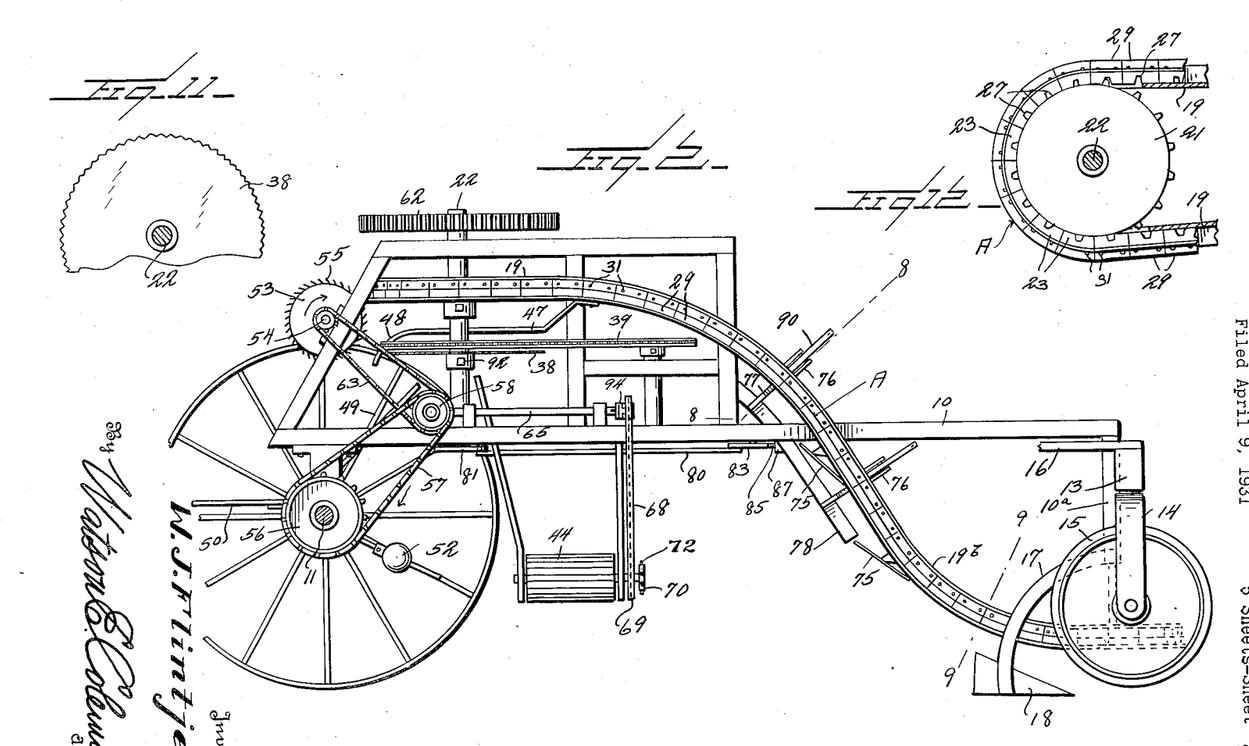
Figure 5 is a front elevation of the structures shown in Figures 1 and 2.
Fig. 11 is a plan view of one of the cutters.
Fig. 12 is a plan of a sprocket wheel 21 and the track.

Referring to these drawings, and particularly to Figures 1, 2 and 5, it will be seen that I have provided a supporting frame designated generally 10 which is shown as approximately rectangular in plan.

The rear end of this frame is supported upon an axle 11 having wheels 12. The forward end of the frame has the transverse axle 13 carrying dirigible yokes 14 in which the front steering wheels 15 are mounted. These yokes have rearwardly extending arms 16 which may be connected to any suitable steering mechanism, not shown. Inasmuch as these front wheels may be turned to steer the machine by many different mechanisms, I have not considered it necessary to illustrate the steering mechanism.

Disposed upon a depending portion 10$^a$ of the frame 10, as shown in Figure 5 are the two downwardly and inwardly extending supports 17 which carry upon them the beet pulling blades 18. The beet pulling means form no part of my invention as there are many beet pulling devices on the market which may be used. These beet pullers are disposed somewhat rearward of the axis of the wheels 15, the arms 17 being curved rearward and downward as shown in Figure 2 in order to support these beet pulling blades 18. These blades plow beneath the ground and lift the beet bodily upward.

Figures 8, 9, 10:
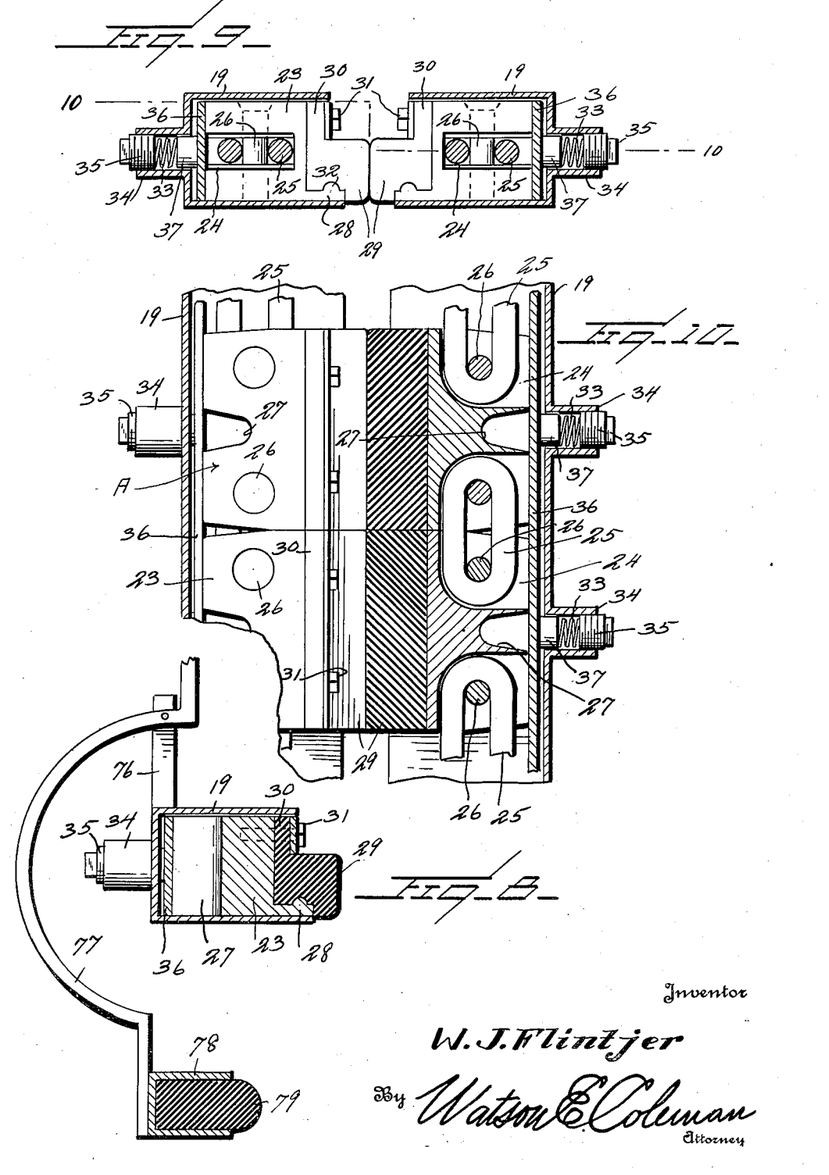
Figure 8 is an enlarged vertical section on the line 8—8 of Figure 2.
Figure 9 is an enlarged section on the line 9—9 of Figure 2.
Figure 10 is a section on the line 10—10 of Figure 9.

Mounted upon the frame and extending upward and rearward in a reverse curve as shown in Figure 2 are two casings constituting rails or tracks 19, these two tracks being shown in cross section in Figure 9. These tracks are U-shaped in cross section and have their open ends confronting each other. These tracks 19, as will be seen in Figure 1, are extended upward and rearward and then extend laterally in an arc of a circle as at 19ª and then extend downward and forward in a reverse curve as at 19b. The portion 19a of the track has its back wall cut away to permit the sprocket wheels which engage with the endless elements disposed within said tracks to project into the tracks and engage with the endless elements. At their forward ends, the portions 19 of the tracks are curved around idler sprocket wheels 20 mounted upon the frame and merge into the portions 19b of the tracks. Where the tracks curve around the sprocket wheels 21, they are likewise open at the back so as to permit the teeth of the sprocket wheels 20 to engage the endless elements disposed within the tracks. The endless elements disposed within these tracks are driven by the sprocket wheels 21 shown in dotted lines in Figure 1, these sprocket wheels being mounted upon a pair of vertical shafts 22 supported in bearings in the frame of the machine and driven as will be later stated.

Referring to Figures 9 and 10, it will be seen that each endless element designated generally A is formed of a series of members 23 which are slotted as at 24 for the reception of the chain links 25, these chain links, as shown clearly in Figure 9, being held in place within the slots 24 by the vertical pins 26. Each of these members 23 is formed on its rear face with the recess 27 with which the teeth on the sprocket wheels 21 and 20 are adapted to engage. The members 23 are each formed adjacent the lower face with an outwardly projecting flange 28 and disposed against the outer face of the members 23 is a rubber block 29 which is rabbeted so as to provide at its rear end an upwardly projecting flange or extension 30 through which the screws 31 pass into the member 23 to hold the block in place. The under face of this block is recessed to receive a curved rib 32 formed on the flange or seat 28. The beet top is gripped between these rubber blocks 29 and is carried upward and rearward relative to the frame of the machine by being grasped between these blocks 29 which constitute beet top grippers.

The members 23 are urged toward each other by means of a plurality of coiled compression springs 33 shown in Figure 10 which are contained in sleeves 34 formed upon the casing or housing 19. Adjustable plugs 35 are engaged in these sleeves and bear against the springs so that the tension of the springs may be adjusted.

Disposed to bear against the outer faces of the members 23 is a plate 36 having bosses 37 which project into the sleeves 34 and against which the springs 33 bear. Thus this follower plate 36 urges the endless elements A formed of the members 23 toward each other. Of course, as before stated, the back of the casing 19 is cut away where these endless elements pass around the sprocket wheels 21 and 20 and, of course, at these cut-away points, there is no plate 36.

As illustrated the casing 19 or track is extended along the entire path of movement of each endless element A. The blades 36, however, with the sleeves 34 and plugs 35 with corresponding springs are not used on the outer flights or runs of the endless element A.

It will be seen that by the mechanism just described, the beets are lifted by their tops and are carried upward and rearward relative to the frame of the machine.

Figures 5, 6, 7:
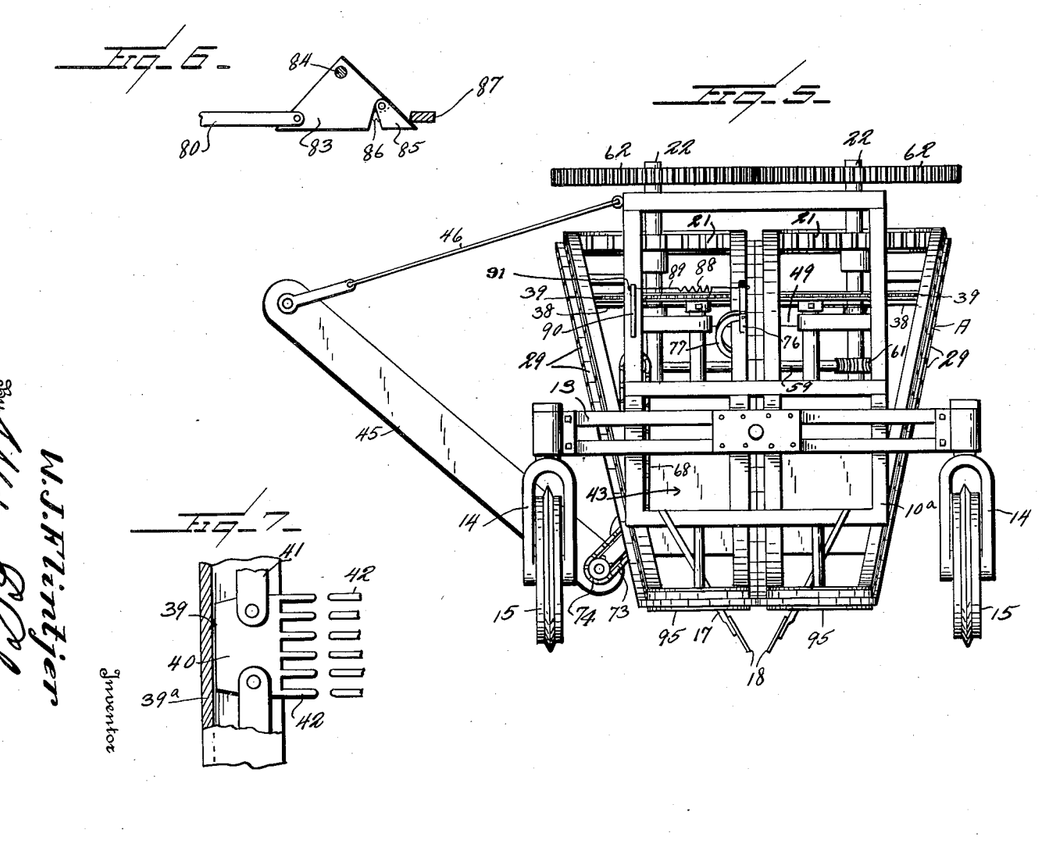
Figure 6 is a detailed elevation of part of the agitating mechanism.
Figure 7 is a top plan view of the endless members which act to hold the beets down while the beets are being cut from the beet tops and withdraw the tops from the gripping members.

Disposed upon the shafts 22 are the disklike cutting knives 38 which may have their edges saw-toothed. These knives are designed to cut the beet from the beet top. In order to stretch the beet downward so that a clean cut may be made, I have provided just above the knives 38 the endless chains designated generally 39 which are made up as shown in Figure 7 of plates 40 and links 41. The plates 40 are provided with inwardly projecting spaced teeth 42 so that as the beet is brought upward by the grippers, the beet being in a depending position and supported entirely by the beet top, these teeth 42 will engage at the junction of the beet top with the beet. These chains run in transversely U-shaped guides 39a as shown in Fig. 7.

Figures 3, 4:
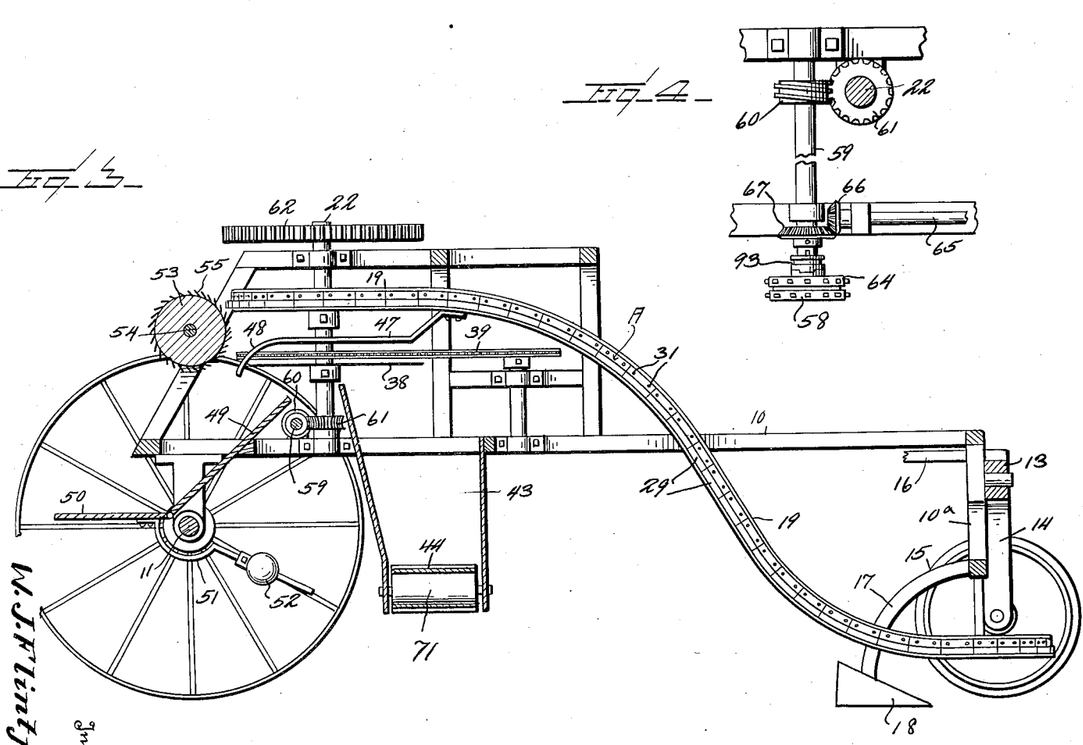
Figure 3 is a longitudinal vertical section thereof.
Figure 4 is a fragmentary detailed plan view of the driving mechanism.

The track 19 as shown best in Figure 3 extends upward relative to the endless chain 39 and hence the beet top will be pulled straight and the beet top will be supported firmly against movement at the time that the knife 38 is cutting the beet top from the beet. As soon as it is cut, the beet falls into the trough 43 of a conveyor 44 whereby the beet is carried laterally and then discharged on to an endless elevator designated generally 45. The endless conveyor 44 may be of any suitable form as may the elevator. The means for driving the endless elevator and the conveyor will be later stated. The elevator is supported in an upwardly inclined position by means of the support 46 shown in Figure 5 or any other suitable means may be used. By this means, the beet is discharged into a wagon.

Disposed above the endless chains 39 and mounted upon the casing or track 19 are two guide rods 47 which extend rearward, inward and downward as at 48, these guide rods acting to guide the beet tops as they are detached or pulled downward from the grippers on to an inclined board 49 (see Figure 3), which in turn discharges the beet tops on to a hinged platform 50. This platform is supported in a horizontal position by means of an arm 51 having upon it the adjustable weight 52 and when a certain amount of beet tops have accumulated upon this platform 50, a counterweight 52 will be overbalanced and the platform 50 will swing downward, discharging the beet tops on to the ground, whereupon the platform will be returned to its normal position by the weight 52. By adjusting this weight 52, the machine may be caused to dump the beet tops when any desired amount of beet tops have accumulated upon the platform 50.

In order to make certain that the beet tops do not cling to the fingers 42 nor to the grippers but are discharged downward upon the board 49, I have provided a roller 53 mounted upon a shaft 54 and provided with inclined teeth 55. This roller rotates in a clockwise direction, the teeth being inclined oppositely to the direction of rotation so that these teeth or prongs on the roller will sweep the beet tops downward off of the fingers 42 and off of the rods 48 and on to the board 49.

For the purpose of driving the various instrumentalities so far described, I mount upon the rear axle 11 the sprocket wheel 56. A sprocket chain 57 passes around the sprocket wheel 56 and over a sprocket wheel 58 mounted upon a transverse shaft 59. This transverse shaft carries upon it the worm gear 60 which engages with a worm wheel 61 mounted upon one of the vertical shafts 22. The upper ends of the vertical shafts 22 carry upon them the intermeshing gear wheels 62 so that both shafts 22 are rotated at the same speed. Thus power is transmitted to the endless gripping elements A. The shaft 54 is driven by a band or sprocket chain designated generally 63 (see Figure 2) which engages with a sprocket wheel 64 mounted upon the shaft 59. The endless chains 39 are, of course, driven from the shafts 22 so that they have the same speed as the sprocket wheels 21. The elevator is shown as being driven by means of a longitudinally extending shaft 65 having a beveled gear 66 meshing with a beveled gear 67 on the shaft 59. This shaft 65 carries upon it the sprocket wheel driving a sprocket chain 68 which engages over a sprocket wheel 69 mounted upon the shaft 70 carrying the roller 71 over which the endless carrier 44 passes.

This shaft 70 also carries upon it a sprocket wheel 72 from which power is transmitted by means of a sprocket chain 73 to a sprocket wheel 74 shown in Figure 5 and driving the endless element of the elevator 45.

It is necessary in order to put the beets in marketable shape with the least possible work that sand and earth shall be detached from the beets before they are discharged into the wagon. To this end, I have provided, as shown in Figures 1 and 2, oppositely inclined deflecting arms 75 disposed in the path of movement of the beets, these arms being rigidly engaged with the portion 19 of the track. As the beets are carried upward, they will strike these arms and the beets will swing relative to the tops and in case there is sand upon the beets, this sand will be shaken off. These members 75 may be used alone where the beets have grown in sandy soil and, therefore, come up relatively clean except for the sand clinging to them, but where the beets are grown in earthy soil, which earth is liable to cling to the beets and must be dislodged by more positively acting means, I have provided the mechanism which is particularly shown in detail in Figures 2 and 8. In Figure 2, it will be seen that there are attached to the casing or track 19 a plurality of upwardly extending supports or brackets 76 one of which is shown in Figure 8. Pivoted upon each support 76 is a downwardly and outwardly curved arm 77 which at its lower end carries the U-shaped housing 78. This housing is relatively long and follows the shape of the track 19 and constitutes an elongated track. There are two of these pivoted arms 77 to support this housing. Disposed within the housing is a strip 79 of rubber or other suitable material and constituting an agitator projecting outward beyond the housing and having a rounded face which will engage the body of the beet. It is necessary that this agitator 79 be swung or oscillated at intervals so as to strike the beet and thus jar off the particles of dirt which may be adhering thereto.

To this end, I provide, as illustrated in Figure 2, a longitudinally extending rod 80 which at one end is connected to a crank 81 mounted upon one of the shafts 22. The rod will thus be reciprocated. Pivotally mounted upon the frame of the machine as shown in Figure 6 is a bell crank lever 83 shown as mounted upon a pivot pin 84, one end of this bell crank lever being connected to the rod 80. The other end is provided with a pivoted nose 85 which is held in normal position by a spring 86. This nose engages a lug 87 formed upon the casing 78 of the agitator. As this rod 80 is reciprocated, the bell crank lever rocks and upon a movement in one direction, the nose will snap past the lug and upon a movement in the other direction, the nose will engage the lug 87 and this will swing the agitator. The upper end of the agitator arm 77 is connected, as shown in Figure 5 by a wire to a coiled contractile spring 88, this spring in turn being connected by a wire 89 to an upwardly extending post or other support 90 through which the wire passes. The end of the wire is engaged by an adjusting nut 91 so that the tension on the spring may be adjusted. When the rod 80 is reciprocated in one direction, the agitator will be swung outward against the action of the spring 88 and then the spring will swing the agitator inward and the agitator will strike the beet and jar the dirt therefrom. This will occur a number of times as the beet is being carried upward by the endless grippers and thus all adherent dirt will be jarred off before the beet reaches the endless chain 39.

The endless gripping elements A and the endless chains 39 are designed to move rearward at the same speed that the machine is moving forward.

As the machine moves forward over the ground, the beet is lifted from the ground by means of the beet pullers 18 and simultaneously it is grasped by the endless members 29 and the beet is carried upward relative to the ground. The two rows of gripping blocks 29 hold the beet top with the beet depending therefrom and regardless of the size, weight or shape of the beet. As the beets pass the beater or agitator 79 or agitators 75, the dirt and clods are knocked from the beets. In sandy soil, as before stated, the agitator 79 with its allied parts is not necessary. As the beet is carried rearward relative to the machine, the lower portion of the beet top is engaged by the fingers 42 of the endless chains 39 which travel at the same speed as the gripping blocks. These fingers pass over the top of the beet and hold the beet down, the fingers lying flat on the top of the beet. The beet top, that is, the leaves, slips through between the gripping blocks 29. The beets are thus carried back to the knives 38. These knives can be set up or down by means of the set screw 92 passing through the hubs upon which the knives are mounted. The same is true with regard to the sprocket wheels over which the chains pass. The body of the beet is cut just below the top by the knives 38 and the body of the beet falls to the conveyor 44. This conveyor 44 runs faster than the elevator 45, thus giving the beets a rolling motion, thus still further removing any earth which may cling to the beet. This rolling action given to the beets causes them to be thrown into the elevator 45, which lifts the bodies of the beets to a wagon truck or hopper. The top of the beet remains gripped by the fingers 42 and by the gripping blocks 29 until they pass around the corresponding sprockets when they are released and fall downward on to the guides 47. The guide bars 47 pull the tops from the gripping blocks and from the guides 47 and as the rear end of these guides are turned downward the tops are directed downward on to the back board 49 and the platform 50. This platform, as before described, is self-dumping and the counter-weight is adjustable to regulate the size of the piles so dumped. The size of the piles can be made to suit weather and drying conditions. It will be seen that the tops are kept clean, free from dirt and piled in neat clean piles of any predetermined size.

A clutch 93 as shown in Figure 4 is preferably provided for disconnecting the driving sprocket 58 from shaft 59 or connecting it thereto and a further clutch 94 is provided between the sprocket wheel on shaft 65 and the shaft so that the conveyor 44 may be stopped when there is no wagon or truck under the elevator. The idler sprocket wheels 20 are shown as supported upon tractor plates 95 shown in Figure 5 which act to support the track 19 at the point where this track extends around the forward sprocket 20. At any desired points, tighteners may be used on the endless elements 23 or for the endless chains 39. I have not illustrated these as this will be understood.

It will be seen that I have provided a machine which will raise the beet from the ground, carry the beet upward supported by the beet top, swing the beet and agitate it so as to get sand and dirt off of the beet body and beet leaves, cuts off the beet and discharges it eventually into a wagon and discharges the beet tops in a clean condition and then deposits these beet tops in regulatable piles.

While I have illustrated certain details of construction and arrangement of parts which I believe to be particularly effective, I do not wish to be limited to these details and arrangements except as defined in the appended claims as obviously many modifications might be made therein.

I claim:—

1. A beet loader including a wheeled supporting frame, a beet digging means carried at the forward end of the frame, opposed endless elements extending horizontally and rearward, then upward and then rearward and then again horizontally and rearward, and carrying beet top gripping members, forward and rear sprocket wheels for supporting and driving said endless elements, opposed rotatable cutting knives disposed below the rear sprocket wheels and opposed endless chains movable in a horizontal plane just above the cutting knives and extending forward to a point adjacent the upward and rearward flights of said endless elements, the chains being formed with beet top gripping fingers whereby to support the beet top just above the body of the beet as the beet top is engaged by said knives.

2. A beet loader including a wheeled supporting frame, a beet digging means carried at the forward end of the frame, opposed endless elements extending upward and rearward from the diggers, means for supporting and driving said endless elements, beet top cutting means disposed below the rear portions of said endless elements, means for engaging a beet top just above the body of the beet and supporting said beet top when it is presented to the knives, a conveyor into which the body of the beet is discharged, a counter-weighted, hinged platform mounted upon the frame of the machine and upon which the beet tops are discharged, and means for sweeping the beet tops from engagement with said endless elements and said beet top supporting means and positively discharging the beet tops downward upon said platform.

3. A beet loader including a wheeled supporting frame, a beet digging means carried at the forward end of the frame, opposed endless elements extending rearward from above the beet digging means and extending upward and rearward and carrying opposed beet top gripping means, a track for guiding said endless elements in their paths of motion, idler sprocket wheels supporting the forward ends of said endless elements, rear sprocket wheels supporting the rear ends of the endless elements, means for driving said endless elements including vertical shafts, rotatable knives mounted upon said shafts below the path of travel of the endless elements, other sprocket wheels mounted upon the shafts above the knives, horizontally disposed, opposed sprocket chains mounted upon said last named sprocket wheels and having outwardly projecting fingers, the fingers on opposed flights of the chains being adapted to engage the beet tops as they are carried upward by the endless elements just above the top of the beet body, other sprocket wheels supporting the forward portions of said endless finger carrying chains, a conveyor into which the beet bodies are discharged after being cut from the tops, and means for disengaging the tops from said endless elements and from said chains at the rear ends thereof.

4. A beet loader including a wheeled supporting frame, a beet digging means carried at the forward end of the frame, opposed endless elements extending rearward from above the beet digging means and extending upward and rearward and carrying opposed beet top gripping means, a track for guiding said endless elements in their paths of motion, idler sprocket wheels supporting the forward ends of said endless elements, rear sprocket wheels supporting the rear ends of the endless elements, means for driving said endless elements including vertical shafts, rotatable knives mounted upon said shafts below the path of travel of the endless elements, other sprocket wheels mounted upon the shafts upon the knives, horizontally disposed, opposed sprocket chains mounted upon last named sprocket wheels and having outwardly projecting fingers, the fingers on opposed flights of the chains being adapted to engage the beet tops as they are carried upward by the endless elements just above the top of the beet body, other sprocket wheels supporting the forward portions of said endless finger carrying chains, a conveyor into which the beet bodies are discharged after being cut from the tops, means for disengaging the tops from said endless elements and from said chains at the rear ends thereof, and a counterweighted platform upon which said beet tops are discharged.

5. A beet loader including a wheeled supporting frame, beet digging and cleaning means carried at the forward end thereof, opposed endless elements extending upward and rearward from the digging means and at their rear ends being disposed in a horizontal plane, driving sprocket wheels supporting the rear ends of said endless elements, idler sprocket wheels supporting the forward ends of the endless elements, rails approximately U-shaped in cross section and engaging the outer and inner flights of said endless elements, means for driving said rear sprocket wheels including vertical shafts, means for driving said shafts at the same speed, rotatable cutters mounted upon the shafts below the endless elements, other sprocket wheels mounted upon the shafts just above the cutters, opposed endless chains mounted upon said last named sprocket wheels, the chains having outwardly projecting fingers, idler sprocket wheels carrying the forward portions of said chains, said chains being disposed in a horizontal plane intersecting upwardly and rearwardly extending portions of the endless elements whereby the beets depending from the endless elements by their tops will be engaged by said chains each just above the top of the beet and thus the beets be supported for presentation to the knives, a conveyor into which beet bodies drop, an elevator into which the conveyor discharges, and means for detaching the beet tops from said endless elements and the chains.

6. A beet loader, a wheeled supporting frame, vertical shafts mounted upon said frame, opposed sprocket wheels carried by the shafts, opposed endless beet top gripping elements mounted upon said sprocket wheels, opposed rotatable knives mounted upon the shafts below the sprocket wheels, other sprocket wheels mounted upon said shafts just above said knives, an endless chain passing over said last named sprocket wheels and having outwardly projecting fingers, each chain for a portion of its length being parallel to the path of travel of the endless elements whereby the beets are carried to the knives with the body of the beet below the knives and the tops supported by said endless elements and the chains, and means for detaching the beet tops from said endless elements and the chains comprising a roller rotating downward and toward the rear portions of the chains and having teeth extending tangentially to the surface of the roller and away from its direction of rotation.

7. In a beet loader, a wheeled supporting frame, beet digging means carried at the forward end of the frame and opposed endless elements extending upward and rearward from the digging means, a rear pair of driving sprocket wheels carrying the rear ends of the sprocket elements, a forward pair of sprocket wheels supporting the forward portions of the elements, U-shaped rails supporting the endless elements, the endless elements being formed of flexibly connected members each having an outwardly projecting flange, rubber blocks supported against the outer faces of said members and having interlocked engagement with said flange, the rubber blocks projecting beyond the tracks, means on the rails for urging the endless elements toward each other.

8. A beet loader of the character described, including a wheeled supporting frame, beet digging means carried at the forward end of the frame, opposed endless elements extending upward and rearward from the digging means, sprocket wheels for supporting and driving said endless elements, the endless elements carrying beet top gripping members, cutting means disposed in the path of movement of the beets supported by said endless elements, and means disposed between the digging means and the cutting means acting to oscillate the beet body suspended from said endless elements, said means including an elongated member swingingly supported below the endless elements and adjacent to the path of movement of the beet, springs urging said elongated member into the path of movement of the beet, and means acting to intermittently shift said member outward from the path of movement of the beet and then release it whereby it will swing inward and strike the beet.

9. A beet loader of the character described, including a wheeled supporting frame, beet digging means carried at the forward end of the frame, opposed endless elements extending upward and rearward from the digging means, a track for supporting said endless elements, brackets mounted upon said track, arms pivotally supported upon the brackets and extending below the track, an elongated member extending approximately parallel to the track, but in spaced relation below the same and supported by the lower ends of said arms adjacent to the path of movement of the beet, springs engaging the upper ends of said arms and urging said elongated member inward toward the path of movement of the beets, and means for retracting said elongated member and then allowing it to swing inward including a bell crank having a pivoted nose, there being a lug on the elongated member with which the nose is adapted to engage, a crank, a rod connecting the bell crank with the crank, and means for constantly driving said crank.

10. A beet loader including a wheeled supporting frame, beet digging and cleaning means carried at the forward end thereof, opposed endless elements extending upward and rearward from the digging means and at their rear ends being disposed in a horizontal plane, driving sprocket wheels supporting the rear ends of said endless elements, idler sprocket wheels supporting the forward ends of the endless elements, tracks approximately U-shaped in cross section and engaging the outer and inner flights of said endless elements, means for driving said rear sprocket wheels including vertical shafts, means for driving said shafts at the same speed, rotatable cutters mounted upon the shafts below the endless elements and disposed in a horizontal plane, other sprocket wheels mounted upon the shafts just above the cutters, opposed endless chains mounted upon said last named sprocket wheels, the chains having outwardly projecting fingers, idler sprocket wheels carrying the forward portions of said chains, the chains being disposed in a horizontal plane intersecting upwardly and rearwardly extending portions of the endless elements whereby the beets depending from the endless elements by their tops will be engaged by said chains each just above the top of the body of the beet and thus the beet be supported for presentation to the knives.

11. In a beet loader, opposed endless elements for engaging the beet tops, and U-shaped rails supporting the endless elements, the endless elements being formed of members, each recessed longitudinally adjacent its ends, links having their ends disposed in said recesses and pivotally connected to said members, the inner faces of the members being recessed for the reception of sprocket teeth, the outer face of each member having an outwardly projecting flange, rubber blocks supported against the outer faces of said members, each block adjacent its upper end being rabbeted and on its lower face having interlocking engagement with the flange of the corresponding member, and bolts passing through the rabbeted face of the block into said member and holding the block in place.

In testimony whereof I hereunto affix my signature.

WALTER J. FLINTJER.